United States Patent
Ng et al.

(10) Patent No.: US 7,244,928 B2
(45) Date of Patent: Jul. 17, 2007

(54) OPTICAL ENCODER

(75) Inventors: Kean Foong Ng, Penang (MY); Sze Kuang Lee, Kedah (MY); Hock Aun Tan, Kedah (MY); Weng Fei Wong, Penang (MY); Wee Jin Yeap, Penang (MY); Chee Foo Lum, Penang (MY); Kok Hing Fo, Penang (MY); Toshiya Hataguchi, Hachiouji (JP); Randeep Singh A/L Amarjit Singh, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 157 days.

(21) Appl. No.: 11/031,280

(22) Filed: Jan. 7, 2005

(65) Prior Publication Data

US 2006/0151686 A1    Jul. 13, 2006

(51) Int. Cl.
*G01D 5/34*       (2006.01)
(52) U.S. Cl. .................. 250/231.13; 356/616
(58) Field of Classification Search ........... 250/231.13, 250/231.14; 356/615, 616
See application file for complete search history.

(56) References Cited

U.S. PATENT DOCUMENTS

| 5,235,177 | A | * | 8/1993 | Hutchinson et al. ........ 250/225 |
| 5,428,217 | A | * | 6/1995 | Nakajima et al. ......... 250/214.1 |
| 5,808,730 | A |   | 9/1998 | Danielian et al. |
| 6,800,842 | B2 | * | 10/2004 | Ito ....................... 250/231.13 |

FOREIGN PATENT DOCUMENTS

AT        396 840 B      12/1993
EP      0 365 740 A1      5/1990

OTHER PUBLICATIONS

English translation of Abstract of EP 0365 740 A1.
English translation of Abstract of AT 396 840 B.
UK Office Action of Apr. 28, 2006.
Agilent Technologies, www.agilent.com/semiconductors, "Two Channel High Resolution Optical Incremental Encoder Modules", May 8, 2002, 11 pages.
Agilent Technologies, www.agilent.com/semiconductors, "Agilent AEDS-962x for 300 LPI Ultra Small Optical Encoder Modules", Nov. 26, 2002, 10 pages.
Thomas E. Kissell, "Linear and Rotary Encoders", www.zone.ni.com, at least as early as Nov. 19, 2004, 5 pages.

* cited by examiner

*Primary Examiner*—Georgia Epps
*Assistant Examiner*—Stephen Yam

(57) ABSTRACT

An optical encoder includes a code strip having a first side, a second side, a first track comprising indicia thereon, and a second track comprising indicia thereon. The code strip is moveable along a displacement path with respect to the optical encoder. A light source positioned on the first side of the code strip directs light toward the code strip. A first detector element is positioned on the second side of the code strip and is generally aligned with the first track of the code strip. A second detector element is positioned on the second side of the code strip and is generally aligned with the second track of the code strip. The second detector element is also positioned so that the second detector element is located a spaced distance along the displacement path from the first detector element.

15 Claims, 5 Drawing Sheets

US 7,244,928 B2

OPTICAL ENCODER

BACKGROUND

Position and/or motion encoders provide a means for determining the position and/or motion of moveable components. While a wide variety of position encoder systems have been developed and are being used, most position encoder systems can be placed into one of two categories: linear and rotary. As their respective names imply, linear encoder systems may be used to provide an indication of linear or straight-line motion whereas rotary encoders may be used to provide an indication of rotary motion.

Encoder systems of the type described above may be further characterized as analog encoder systems or digital encoder systems. Analog encoder systems provide an analog output signal, such as a voltage or current that is related to the motion detected by the encoder. Analog encoder systems typically utilize a variable resistor or resistance element that is operatively associated with the moveable element. The variable resistor converts the motion of the moveable component into the analog signal.

Digital encoder systems provide a digital output signal that is related to the motion detected by the encoder. Most digital encoder systems are optical in nature, although non-optical digital encoders are also known. An optical digital encoder typically utilizes a light source, a detector, and a code wheel or code strip. The code wheel or code strip is provided with markings or indicia thereon. The detector detects the indicia provided on the code wheel or code strip and produces a digital output signal that is related to the position or movement of the code strip with respect to the detector.

Digital encoders may provide a relative or absolute indication of the relative position of the code wheel or code strip. Generally speaking, relative encoders provide a single set of markings or indicia on the code strip. Because the single set of markings is not unique to the particular position of the code strip, relative encoder systems must utilize a homing routine on start-up in order to derive the actual position of the moveable component. Absolute position encoders typically rely on several sets of indicia on the code strip. The indicia are such that a unique signal is associated with each position of the code strip. Thus, such absolute position encoders can provide an indication of the absolute position of the moveable element without the need to first perform a homing routine.

SUMMARY OF THE INVENTION

An optical encoder according to one embodiment may comprise a code strip having a first side, a second side, a first track comprising indicia thereon, and a second track comprising indicia thereon. The code strip is moveable along a displacement path with respect to the optical encoder. A light source positioned on the first side of the code strip directs light toward the code strip. A first detector element is positioned on the second side of the code strip and is generally aligned with the first track of the code strip. A second detector element is positioned on the second side of the code strip and is generally aligned with the second track of the code strip. The second detector element is also positioned so that the second detector element is located a spaced distance along the displacement path from the first detector element.

BRIEF DESCRIPTION OF THE DRAWINGS

Illustrative and presently preferred exemplary embodiments of the invention are shown in the drawings in which.

DETAILED DESCRIPTION OF THE PREFERRED EMBODIMENT

Figure 1:
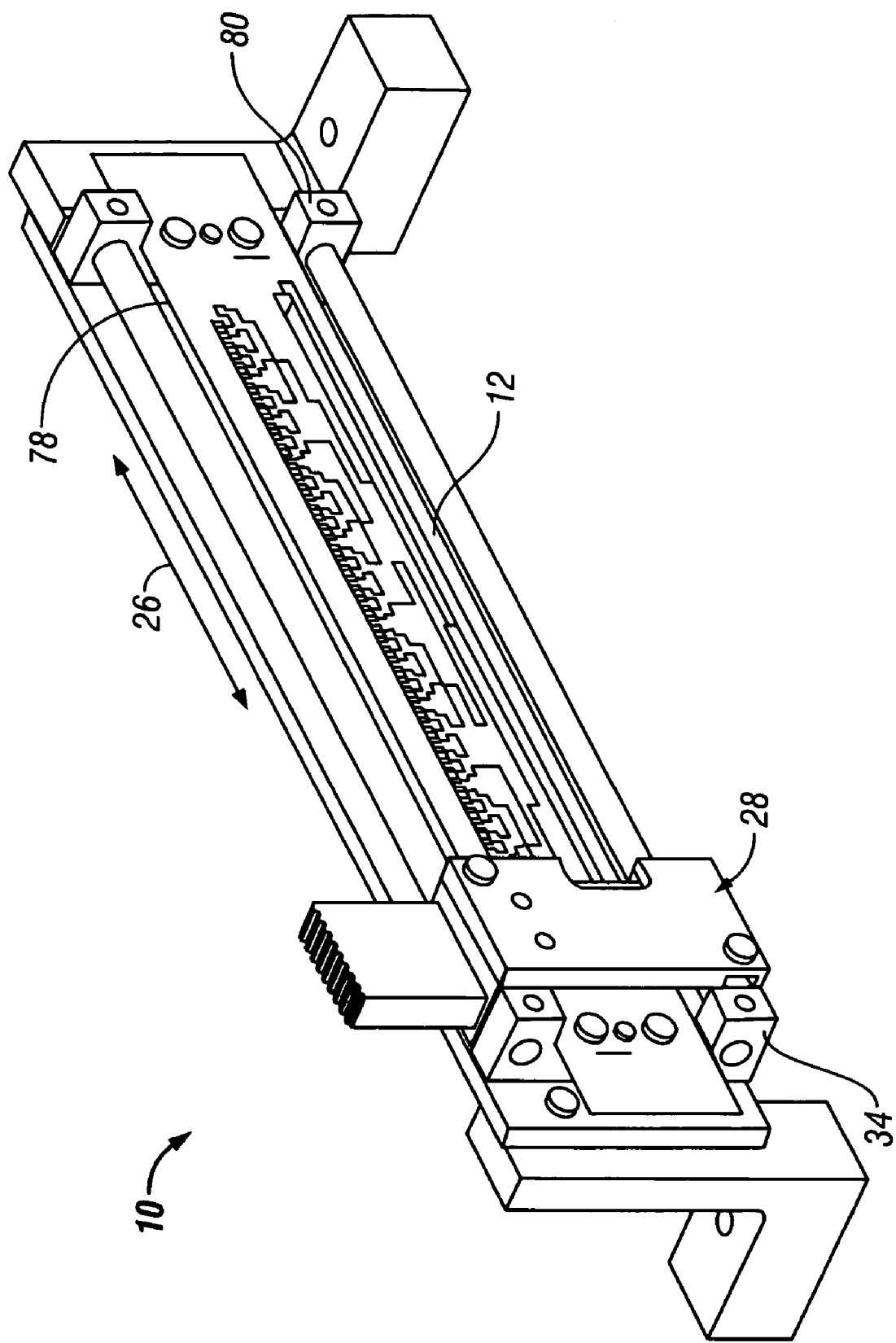
FIG. 1 is a perspective view of one embodiment of an optical encoder.
Figure 2:
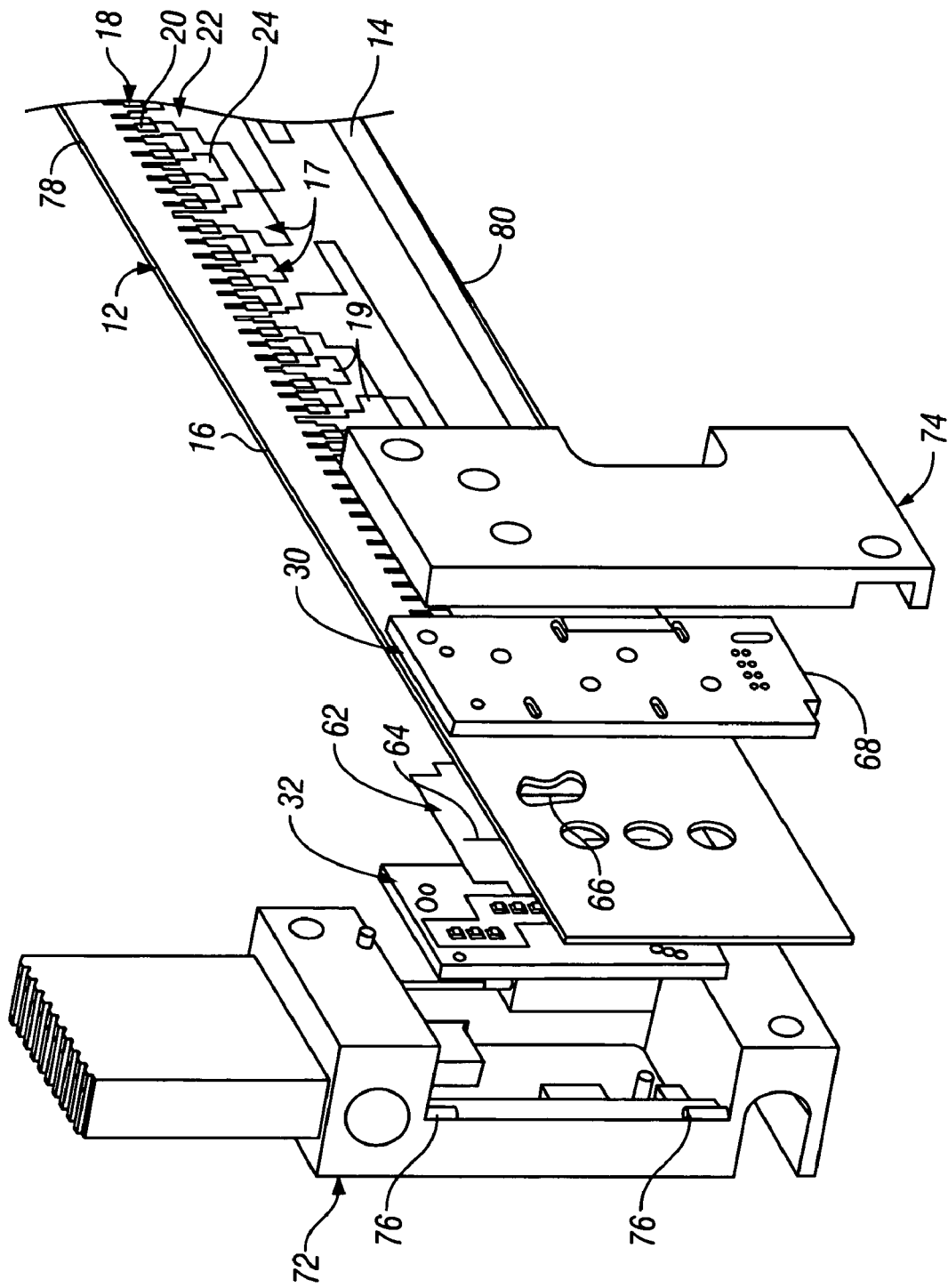
FIG. 2 is an exploded perspective view of the optical encoder of FIG. 1.

One embodiment of an optical encoder 10 is shown in FIGS. 1 and 2 and comprises a code strip 12 having a first side 14 and a second side 16. The code strip 12 comprises a plurality of tracks 17 with indicia 19 provided thereon, such as a first track 18 of indicia 20 and a second track 22 of indicia 24. As will be described in greater detail below, the code strip 12 may be provided with any number of tracks 17 of indicia 19 thereon, depending on a number of factors, including, but not limited to, the desired resolution and the range of motion to be encoded. The code strip 12 is moveable along a displacement path 26 with respect to the optical encoder 10. In the embodiment shown and described herein, a read head 28 of the optical encoder 10 is moveable with respect to the code strip 12, which remains stationary. Alternatively, the code strip 12 could be moveable, with the read head 28 remaining stationary.

With reference now primarily to FIG. 2, the optical encoder 10 may also be provided with a light source assembly 30 and a detector assembly 32. The light source assembly 30 and detector assembly 32 may be mounted to a housing assembly 34. Thus, the read head 28 comprises the light source assembly 30, detector assembly 32, and the housing assembly 34. The arrangement is such that the light source assembly 30 is positioned on the first side 14 of the code strip 12, whereas the detector assembly 32 is positioned on the second side 16 of the code strip 12. The detector assembly 32 is also generally aligned with the light source assembly 30, so that light produced by the light source assembly 30 and passing through the code strip 12 can be detected by the detector assembly 32.

Figure 4:
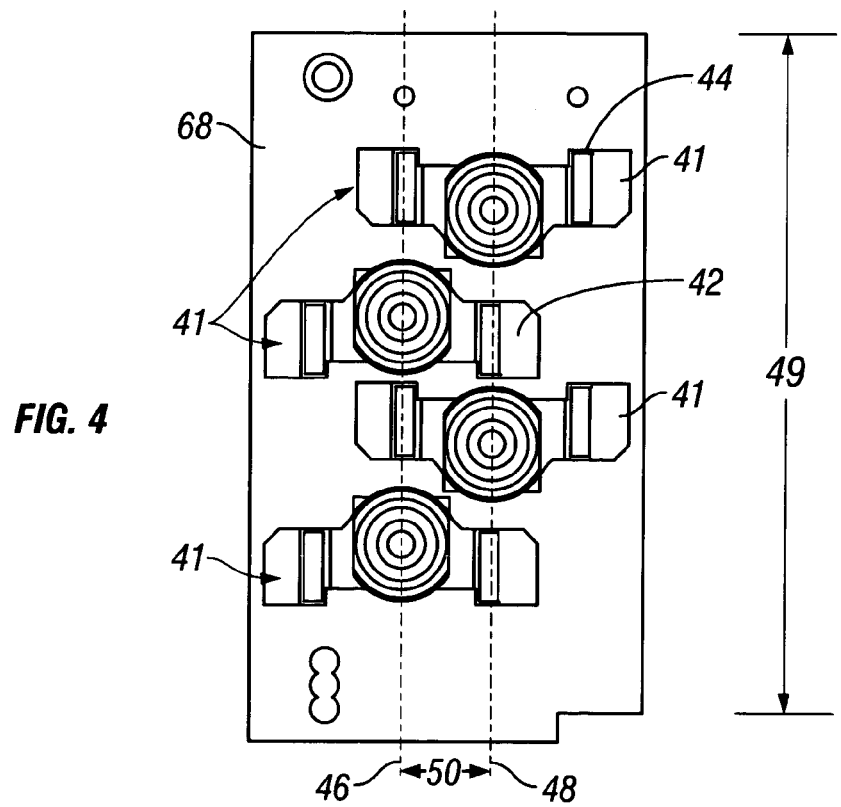
FIG. 4 is a plan view of the light source assembly of the optical encoder of FIG. 1.
Figure 5:
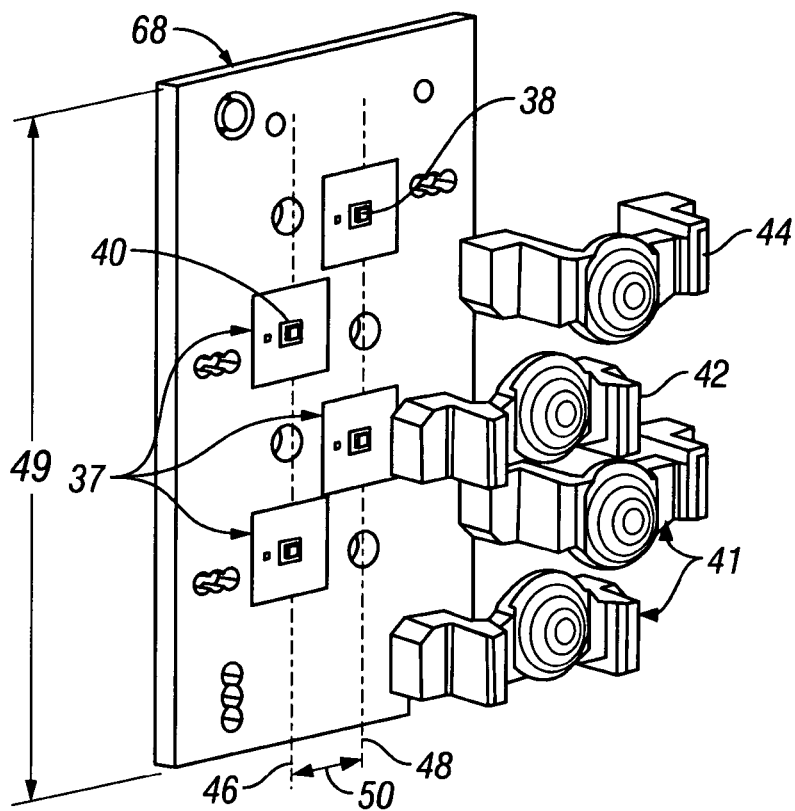
FIG. 5 is an exploded perspective view of the light source assembly of FIG. 4.

The light source assembly 30 is shown in FIGS. 4 and 5 and may comprise a plurality of light emitting elements 37, such as, for example, a first light emitting element 38 at a first location along the displacement path 26 and a second light emitting element 40 at a second location along the displacement path 26. In the embodiment shown and described herein, the light source assembly 30 is provided with additional light emitting elements, as will be described in greater detail below. Each of the plurality of light emitting elements 37 is provided with a corresponding collimating lens 41, such as first collimating lens 42 and second collimating lens 44. The various light emitting elements 37 are positioned in various locations to form the staggered spacing arrangement shown in FIG. 4. More specifically, in one embodiment, the first light emitting element 38 is positioned along a first light emitting element axis 46, whereas the second light emitting element 40 is positioned along a second light emitting element axis 48. The first and second light emitting element axes 46 and 48 are separated by a spaced-distance 50 along the direction of the displacement path 26. As will be explained in greater detail below, this staggered spacing of the first and second light emitting elements 38 and 40 allows the overall length 48 of the light source assembly 30 to be reduced compared to what would otherwise be the case if the individual light emitting elements 37 (e.g., first light emitting element 38 and second light emitting element 40) were aligned along a common axis.

Figure 6:
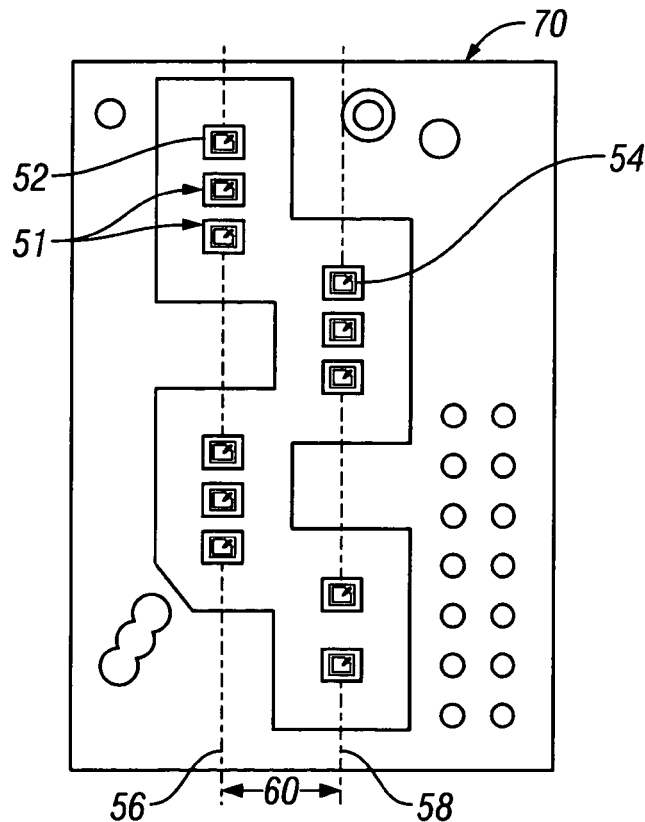
FIG. 6 is a plan view of the detector assembly of the optical encoder of FIG. 1.

The detector assembly 32 is best seen in FIG. 6 and may comprise a plurality of detector elements 51, such as a first detector element 52 positioned at a first location along the displacement path 26 and a second detector element 54 positioned at a second location along the displacement path 26. In the embodiment shown and described herein, the detector assembly 32 is provided with additional detector elements 51, as will be explained in greater detail below. The first detector element 52 is positioned along a first detector element axis 56, whereas the second detector element 54 is positioned along a second detector element axis 58. The first and second detector element axes 56 and 58 are separated by a spaced-distance 60 along the direction of the displacement path 26. In one embodiment, the spaced-distance 60 separating the first and second detector element axes 56 and 58 is substantially equal to the spaced-distance 50 between the first and second light emitting element axes 46 and 48 (FIG. 4).

In addition, the first detector element 52 is generally aligned with the first track 18 of the code strip 12 so that the first detector element 52 detects the indicia 20 comprising the first track 18 of code strip 12. The second detector element 54 is generally aligned with the second track 22 of code strip 12 so that the second detector element 54 detects the indicia 24 comprising the second track 22 of code strip 12.

The staggered spacing of the various detector elements (e.g., 52 and 54) comprising the detector assembly 32, that is to say, the fact that the second detector element 54 is located the spaced-distance 60 along the displacement path 26 from the first detector element 52, means that the indicia 24 comprising the second track 22 of the code strip 12 should be displaced or off-set by substantially the same distance, i.e., the spaced-distance 60.

Figure 3:
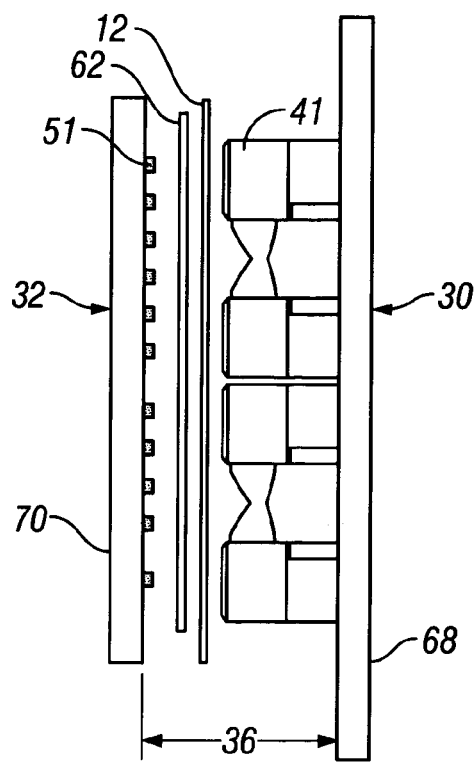
FIG. 3 is a side view in elevation of the optical encoder of FIG. 1.

The optical encoder 10 may also be provided with an aperture plate 62. The aperture plate 62 is positioned between the detector assembly 32 and the code strip 12 in the manner best seen in FIG. 3. The aperture plate 62 defines at least a first aperture 64 that is generally aligned with the first detector element 52 and a second aperture 66 that is generally aligned with the second detector element 40. The aperture plate 62 may be provided with additional apertures, as will be described in greater detail below. In addition, and as will also be described in greater detail below, the aperture plate 62 may in some cases provide for increased resolution of the optical encoder 10.

One useful feature of the optical encoder 10 is that it is readily scalable, thus allowing it to be easily adapted to a wide range of applications. That is, the same basic design can be easily modified by either increasing or decreasing the number of individual light emitting elements 37 and detector elements 51 to accommodate wider or narrower code strips. Another useful feature of the optical encoder 10 is that the staggered arrangement of the light emitting elements 37 allows the overall length 49 of the light source assembly 30 to be reduced over what would otherwise be the case if the staggered spacing were not used. In addition, the use of separate or staggered collimating lenses 41 for each light emitting element 37 allows the overall thickness of the read head 28 to be reduced over what would be otherwise required if a single collimating lens were used for all of the light emitting elements 37. The aperture plate 62 provides for increased sensitivity by limiting the amount of stray light that is allowed to reach the various detector elements 51. The aperture plate 62 may also provide for increased resolution of the optical encoder.

Having briefly described one embodiment 10 of an optical encoder, this and other embodiments will now be described in greater detail. However, before proceeding, it is noted that the optical encoder 10 may be provided with any of a wide range of separate light emitting elements 41 and detector elements 51, depending on its application. In addition, the number of tracks 17 provided on the code strip 12, as well as the number and spacing of the indicia 19 that may be provided on each track may also vary depending on the requirements of the particular application as well as the desired resolution. Similarly, the optical encoder is not limited to use in linear applications and could be readily adapted for use in rotary applications, as would become apparent to persons having ordinary skill in the art after having become familiar with the teachings provided herein.

Referring back now to FIGS. 1 and 2, one embodiment of an optical encoder 10 may be used to determine an absolute position of a code strip 12 relative to a read head 28 of the optical encoder 10. In the embodiment shown and described herein, the read head 28 moves along a displacement path 26 with respect to the code strip 12, which remains stationary. Alternatively, the code strip 12 could be moveable, with the read head 28 remaining stationary. Likewise, the code strip 12 need not comprise a generally rectangularly shaped element, but could instead comprise a disk-like or annular member for use in rotary applications.

In order to provide absolute position sensing, the code strip 12 is provided with a plurality of tracks 17 (e.g., a first track 18 and a second track 22) having indicia 19 (e.g., first set of indicia 20 and second set of indicia 24) provided thereon. The indicia 19 are detectable by the detector assembly 32 in order to allow the detector assembly 32 to detect movement of the code strip 12. Commonly used indicia 19 include, but are not limited to, alternating regions that are substantially transparent and substantially opaque to the light produced by the light source assembly 30. Adjacent tracks 17 are provided with differing indicia to allow the absolute position of the code strip 12 to be determined relative to the read head 28. For example, in one embodiment each successive track 17 is provided with twice the number of indicia (e.g., substantially transparent and substantially opaque regions), thereby allowing each position along the code strip 12 to have a unique "code" associated therewith.

One feature of the code strip 12 that is unique relates to those tracks 17 that correspond to the detector elements 51 (e.g., second detector element 54) that are located at the off-set or displaced position along the displacement path 26, such as those detector elements 51 that are arranged along the second detector element axis 58. As mentioned, the indicia 19 (e.g., indicia 24) of those tracks corresponding to the off-set detectors (e.g., second track 22) should be off-set by the same spaced-distance (e.g., spaced-distance 60) separating the detector elements 51.

Referring now to FIGS. 4 and 5, the light source 30 may comprise a plurality of individual light emitting elements 37, such as a first light emitting element 38 and a second light emitting element 40. Each of the plurality of light emitting elements 37 is provided with a corresponding collimating lens 41, such as first collimating lens 42 and second collimating lens 44. The first light emitting element 38 is positioned along a first light emitting element axis 46, whereas the second light emitting element 40 is positioned along a second light emitting element axis 48. In the embodiment shown and described herein, the light source assembly 30 is provided with additional light emitting elements 37 positioned along the first and second light emitting element axes 46 and 48 in the manner best seen in FIG. 5. However, because persons having ordinary skill in the art would be able to readily provide such additional light emitting elements 37 after having become familiar with the teachings provided herein, the additional light emitting elements 37 that may be utilized will not be described in further detail herein.

As was briefly mentioned earlier, the first and second light emitting element axes 46 and 48 are separated by a spaced-distance 50 along the direction of the displacement path 26. The staggered spacing of the first and second light emitting elements 38 and 40 allows the overall length 49 of the light source assembly 30 to be reduced compared to what would otherwise be the case if the individual light emitting elements 37 were aligned along a common axis. The magnitude of the reduced overall length 49 will be particularly significant in the case where individual collimating lenses 41 are used for each individual light emitting element 37.

As was also mentioned earlier, it is noted that the optical encoder 10 is not limited to use with two light emitting elements 37, such as first light emitting element 38 and second light emitting element 40, but instead could comprise any number of light emitting elements 37. For example, in the embodiment illustrated in FIGS. 4 and 5, the light source assembly 30 comprises a total of four light emitting elements 37, with two light emitting elements 37 arranged along the first light emitting element axis 46 and two light emitting elements 37 arranged along the second light emitting element axis 48. As mentioned, the plurality of light emitting elements 37 are staggered so as to minimize the overall length 49 of the light source assembly 30.

The light emitting elements 37, e.g., first and second light emitting elements 38 and 40, may comprise any of a wide range of light emitting devices that are now known in the art or that may be developed in the future that are or would be suitable for the intended application. Consequently, the light emitting elements 37 should not be regarded as limited to any particular type of light emitting element 37. However, by way of example, the plurality of light emitting elements 37 may comprise light emitting diodes.

The various light emitting elements 37 may be mounted to any of a wide range of structures, such as a printed circuit board, suitable for holding the various light emitting elements 37 at the proper positions on the first side 14 of code strip 12 in the manner described herein. Alternatively, other mounting arrangements are possible, as would become apparent to persons having ordinary skill in the art after having become familiar with the teachings provided herein. By way of example, in one embodiment, the various light emitting elements 37 are mounted to a printed circuit board 68 of the type well-known in the art.

As mentioned, each light emitting element 37 (e.g., first light emitting element 38 and second light emitting element 40) may be provided with a separate collimating lens 41 (e.g., first lens 42 and second lens 44) for collimating the light produced by the light emitting elements 37. The collimating lenses 41 may comprise any of a wide variety of lens shapes and may be fabricated from any of a wide variety of materials, as would become apparent to persons having ordinary skill in the art after having become familiar with the teachings provided herein. Consequently, the collimating lens 41 should not be regarded as limited to any particular type of collimating lens 41 fabricated from any particular material. However, by way of example, in one embodiment, each collimating lens 41 comprises a convex collimating lens fabricated from a transparent plastic material (e.g., acrylic plastic). The collimating lenses 41 may be provided with suitable mounting lugs or tabs and may be secured to the printed circuit board 68 by any convenient means, such as, for example, by a suitable adhesive.

As best seen in FIG. 4, the staggered arrangement of the light emitting elements 37, such as first and second light emitting elements 38 and 40, as well as the corresponding staggered arrangement of the respective collimating lenses 41, such as first and second collimating lenses 42 and 44, makes efficient use of space on the printed circuit board 68 and minimizes the overall length 49 of the light source assembly 30 over what would otherwise be the case if the light sources 37 and lenses 41 were not staggered.

The detector assembly 32 is best seen in FIG. 6 and may comprise a plurality of detector elements 51, such as a first detector element 52 and a second detector element 54. The first detector element 52 is positioned along a first detector element axis 56, whereas the second detector element 54 is positioned along a second detector element axis 58. The first and second detector element axes 56 and 58 are separated by a spaced-distance 60 along the direction of the displacement path 26. In the embodiment shown and described herein, the spaced-distance 60 separating the first and second detector element axes 56 and 58 is substantially equal to the spaced-distance 50 between the first and second light emitting element axes 46 and 48 (FIG. 4). In addition, the first detector element 52 is generally aligned with the first track 18 of the code strip 12 so that the first detector element 52 detects the indicia 20 comprising the first track 18 of code strip 12. The second detector element 54 is generally aligned with the second track 22 of code strip 12 so that the second detector element 54 detects the indicia 24 comprising the second track 22 of code strip 12.

It should be noted that the optical encoder 10 is not limited to use with two detector elements 51, such as first detector element 52 and second detector element 54, but instead could comprise any number of detector elements 51. For example, in the embodiment illustrated in FIG. 6, the detector assembly 32 comprises a total of eleven (11) detector elements 51, with six (6) detector elements arranged along the first detector element axis 56 and with five (5) detector elements 51 arranged along the second detector element axis 58. The use of eleven (11) individual detector elements 51 allows a ten track code strip 12 to be used, with one detector element 51 per track 17. The remaining ($11^{th}$) detector element 51 is used to measure the intensity or light output of the light source assembly 30. If the intensity of the light source assembly 30 is too high or too low, a compensation system (not shown) may be used to adjust the electrical power provided to the light source assembly 30, thereby maintaining the light output within acceptable limits. A ten track code strip 12 will provide a resolution of $2^{10}$ or 1024 discrete positions. Of course, a greater or lesser number of detector elements 51 and code strip tracks 17 could be used depending on the requirements of the particular application. Examples of requirements that would indicate the use of a code strip having a greater or lesser number of tracks 17 include, but are not limited to, the desired resolution as well as the range of motion that is desired to be encoded.

The staggered spacing of the various detector elements 51 (e.g., 52 and 54) comprising the detector assembly 32, i.e., the fact that the second detector element axis 58 is located the spaced-distance 60 along the displacement path 26 from the first detector element axis 56, means that the indicia 24 comprising the second track 22 of the code strip 12 should be displaced or off-set by substantially the same distance, i.e., the spaced-distance 60.

The detector elements 51, e.g., first and second detector elements 52 and 54, may comprise any of a wide range of light detecting devices that are now known in the art or that may be developed in the future that are or would be suitable for the intended application. Consequently, the light detecting element 51 should not be regarded as limited to any particular type of light detecting element 51. However, by way of example, the plurality of light detecting elements 51 may comprise photo-transistors.

The various detector elements 51 may be mounted to any of a wide variety of structures, such as printed circuit boards, suitable for holding the various detector elements 51 at the proper positions on the second side 16 of code strip 12 in the manner described herein. Alternatively, other mounting arrangements are possible, as would become apparent to persons having ordinary skill in the art after having become familiar with the teachings provided herein. By way of example, in one embodiment, the various light detecting elements 51 are mounted to a printed circuit board 70.

The optical encoder 10 may also be provided with an aperture plate 62. The aperture plate 62 defines at least one aperture for each of the detector element axes (e.g., first detector element axis 56 and second detector element axis 58) utilized on the detector assembly 32. In the embodiment shown and described herein, the aperture plate 62 defines at least a first aperture 64 that is substantially aligned with the first detector element 52 on the first detector element axis 56 and a second aperture 66 that is substantially aligned with the second detector element 54 on the second detector element axis 58. Additional apertures may be provided for each grouping of detector elements 51 that may be provided on the detector assembly 32. Generally speaking, it will be desirable to form the first and second apertures 64 and 66 as elongated slits in order to minimize the chances that stray light will reach the detector elements 51.

Depending on the particular application, the aperture plate 62 may also be used to increase the resolution of the optical encoder system over what would otherwise be possible without the aperture plate 62. For example, if the spacings between the various indicia 19 provided on the tracks 17 of the code strip 12 are smaller than the size of the corresponding detector element 51, then the detector element 51 would be incapable of resolving the spacing between the indicia 19. That is, the detector 51 would not be capable of isolating which set of indicia was positioned directly in line with the detector element 51. In order to avoid this problem, the aperture plate 62 may be provided with an aperture having a size (i.e., width) that is substantially equal to the width of the indicia 19 on the code strip 12. The aperture would then prevent light from other indicia 19 from reaching the detector element 51, thereby allowing the detector element 51 to sense only the desired portion of the code strip 12. Stated another way, the detector element 51 will then be able to detect a single indicia 19 on the code strip 12, notwithstanding the fact that the size (i.e., width) of the detector element 51 exceeds the size (i.e., width) of the indicia 19 on the code strip 12.

The housing 34 may be configured to receive the light source assembly 30, the detector assembly 32, as well as the aperture plate 62. Referring now to FIGS. 2, 7a, 7b, and 8, the housing 34 may comprise a detector plate portion 72 and an emitter plate portion 74. The detector plate portion 72 is configured to receive the detector assembly 32 as well as the aperture plate 62. The emitter plate portion 74 is configured to receive the light source assembly 30. The emitter plate portion 74 is securable to the detector plate portion 72 and holds or positions the light source assembly 30 so that it is generally aligned with the detector assembly 32. The housing 34 also positions the light source assembly 30 and detector assembly 32 so that a space 36 is defined therebetween suitable for receiving the code strip 12.

The component spacings provided by the housing 34 are not particularly critical, and any of a wide range of spacing may be used depending on the particular application. Consequently, the housing 34 should not be regarded as limited to a housing providing any particular spacing between the optical encoder's various components. However, by way of example, in the embodiment shown and described herein, the space 36 defined between the light source assembly 30 and the detector assembly 32 is about 6.25 mm; the code strip 12 is positioned about 1.9 mm from printed circuit board 70 of the detector assembly 32; and the aperture plate 62 is positioned about 1.23 mm from the printed circuit board 70 of the detector assembly 32. See FIG. 3.

Figure 7A:
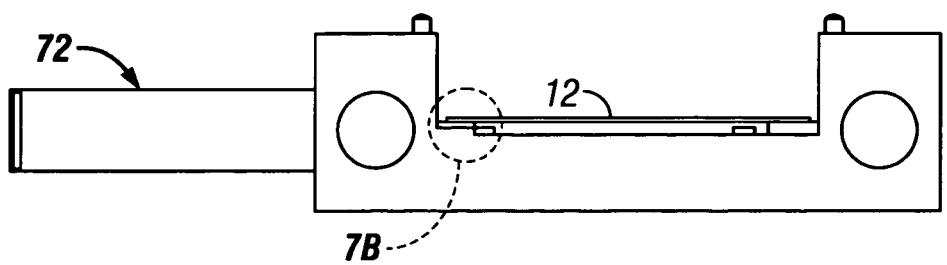
FIG. 7a is a side view in elevation of a portion of the housing of the optical encoder of FIG. 1.
Figure 7B:
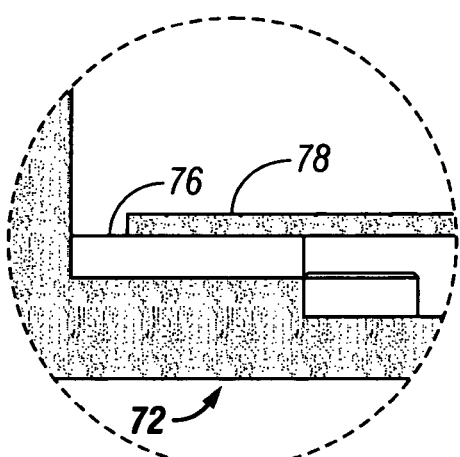
FIG. 7b is an enlarged side view of a portion of the housing more clearly showing one of the bearing surfaces of FIG. 7.
Figure 8:
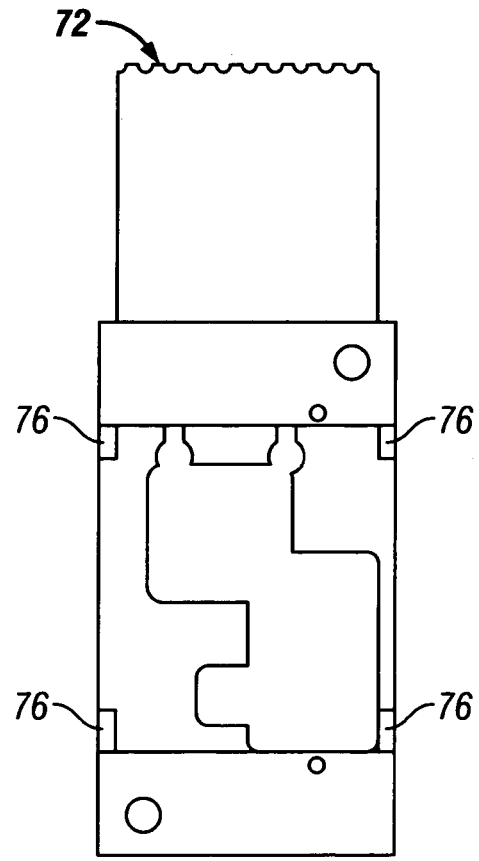
FIG. 8 is a plan view of the housing of FIG. 7 showing the positions of the bearing surfaces.

With reference now to FIGS. 7a, 7b, and 8, the detector plate portion 72 of housing 34 may comprise a plurality of bearing surfaces 76 provided thereon. The bearing surfaces 76 engage corresponding first and second edge portions 78, 80 of code strip 12. The bearing surfaces 76 help to position the code strip 12 an optimal distance from the detector assembly 32 and aperture plate 62, as well as to minimize the likelihood that the code strip 12 will contact either the light source assembly 30, the detector assembly 32 or aperture plate 62.

The bearing surfaces 76 may comprise any of a wide range of shapes and configurations, as would become apparent to persons having ordinary skill in the art after having become familiar with the teachings provided herein. Consequently, the bearing surfaces 76 should not be regarded as limited to bearing surfaces 76 having any particular shapes or configurations. However, by way of example, in one embodiment, each bearing surface 76 comprises a generally semi-cylindrical surface.

The various components (e.g., detector plate portion 72 and emitter plate portion 74) comprising the housing 34 may be fabricated from any of a wide range of materials that would be suitable for the intended application. By way of example, in one embodiment, the detector plate portion 72 and emitter plate portion 74 are molded from a polycarbonate plastic material. Alternatively, other materials could also be used.

What is claimed is:

1. An optical encoder, comprising:
   a code strip having a first side, a second side, a first track comprising indicia thereon, and a second track comprising indicia thereon, said code strip being associated with a displacement path with respect to said optical encoder;

a light source positioned on the first side of said code strip, said light source directing light toward said code strip;

a first detector element positioned on the second side of said code strip so that said first detector element is generally aligned with the first track of said code strip, said first detector element detecting the indicia comprising the first track of said code strip; and a second detector element positioned on the second side of said code strip so that said second detector element is generally aligned with the second track of said code strip, said second detector element being located a spaced distance along the displacement path from said first detector element, said second detector element detecting the indicia comprising the second track of said code strip, wherein the indicia comprising the second track are shifted along the displacement path with respect to the indicia comprising the first track by a distance that is about equal to the spaced distance along the displacement path separating said second detector element and said first detector element.

2. The optical encoder of claim 1, further comprising an aperture plate positioned between said first and second detector elements and said code strip, said aperture plate defining a first aperture therein that is substantially aligned with said first detector element and a second aperture therein that is substantially aligned with said second detector element.

3. The optical encoder of claim 1, wherein said light source comprises a first light emitting element that is substantially aligned with said first detector element and a second light emitting element that is substantially aligned with said second detector element.

4. The optical encoder of claim 3, further comprising a first collimating lens positioned adjacent said first light emitting element and a second collimating lens positioned adjacent said second light emitting element.

5. The optical encoder of claim 1, wherein the indicia comprising the first track comprise a plurality of substantially transparent portions and a plurality of substantially opaque portions and wherein the indicia comprising the second track comprise a plurality of substantially transparent portions and a plurality of substantially opaque portions.

6. The optical encoder of claim 1, further comprising a housing, said housing being adapted to receive said light source and said first and second detector elements in generally parallel, spaced-apart relation, said housing defining a bearing surface, said bearing surface slidably engaging said code strip when said code strip is positioned in a space defined between said light source and said first and second detector elements, said bearing surface maintaining a spacing alignment of said code strip within the space defined between said light source and said first and second detector elements.

7. The optical encoder of claim 6, wherein said bearing surface comprises a first bearing surface positioned at about a first end of said housing so that said first bearing surface slidably engages a first edge portion of said code strip and a second bearing surface positioned at about a second end of said housing so that said second bearing surface slidably engages a second edge portion of said code strip.

8. The optical encoder of claim 7, wherein said first and second bearing surfaces comprise semi-cylindrical surfaces.

9. An optical encoder, comprising:

a code strip having a first side, a second side, a first track comprising indicia thereon, and a second track comprising indicia thereon, said code strip being associated with a displacement path with respect to said optical encoder;

a light source positioned on the first side of said code strip, said light source directing light toward said code strip;

a first detector element positioned on the second side of said code strip so that said first detector element is generally aligned with the first track of said code strip, said first detector element detecting the indicia comprising the first track of said code strip;

a second detector element positioned on the second side of said code strip so that said second detector element is generally aligned with the second track of said code strip, said second detector element being located a spaced distance along the displacement path from said first detector element, said second detector element detecting the indicia comprising the second track of said code strip; and a housing, said housing being adapted to receive said light source and said first and second detector elements in generally parallel, spaced-apart relation, said housing defining a bearing surface, said bearing surface slidably engaging said code strip when said code strip is positioned in a space defined between said light source and said first and second detector elements, said bearing surface maintaining a spacing alignment of said code strip within the space defined between said light source and said first and second detector elements.

10. The optical encoder of claim 9, wherein said bearing surface comprises a first bearing surface positioned at about a first end of said housing so that said first bearing surface slidably engages a first edge portion of said code strip and a second bearing surface positioned at about a second end of said housing so that said second bearing surface slidably engages a second edge portion of said code strip.

11. The optical encoder of claim 10, wherein said first and second bearing surfaces comprise semi-cylindrical surfaces.

12. The optical encoder of claim 9, further comprising an aperture plate positioned between said first and second detector elements and said code strip, said aperture plate defining a first aperture therein that is substantially aligned with said first detector element and a second aperture therein that is substantially aligned with said second detector element.

13. The optical encoder of claim 9, wherein said light source comprises a first light emitting element that is substantially aligned with said first detector element and a second light emitting element that is substantially aligned with said second detector element.

14. The optical encoder of claim 13, further comprising a first collimating lens positioned adjacent said first light emitting element and a second collimating lens positioned adjacent said second light emitting element.

15. The optical encoder of claim 9, wherein the indicia comprising the first track comprise a plurality of substantially transparent portions and a plurality of substantially opaque portions and wherein the indicia comprising the second track comprise a plurality of substantially transparent portions and a plurality of substantially opaque portions.

* * * * *